United States Patent [19]
Miyota et al.

[11] Patent Number: 5,286,325
[45] Date of Patent: Feb. 15, 1994

[54] METHOD OF MANUFACTURING A SEAT USING ADHESIVE

[75] Inventors: Akihiro Miyota; Shuichi Hashiguchi, both of Tochigi, Japan

[73] Assignee: Tokyo Seat Co., Ltd., Japan

[21] Appl. No.: 932,672

[22] Filed: Aug. 20, 1992

[30] Foreign Application Priority Data

Aug. 27, 1991 [JP] Japan .................................. 3-238873

[51] Int. Cl.⁵ .............................................. B32B 31/20
[52] U.S. Cl. .................................... 156/212; 156/228; 156/311; 156/583.1
[58] Field of Search ................ 156/212, 228, 245, 311, 156/285, 383, 583.1, 583.8; 297/455, 457; 100/93 P; 264/321, 324

[56] References Cited

U.S. PATENT DOCUMENTS

| | | | |
|---|---|---|---|
| 3,318,636 | 5/1967 | Callum | 156/212 |
| 3,669,498 | 6/1972 | Meyers et al. | 297/455 |
| 4,795,517 | 1/1989 | Elliot et al. | 156/290 |
| 5,066,351 | 11/1991 | Knoll | 156/311 |

FOREIGN PATENT DOCUMENTS 3-68391 3/1991 Japan .

Primary Examiner—Michael W. Ball
Assistant Examiner—Richard Crispino
Attorney, Agent, or Firm—Hill, Steadman & Simpson

[57] ABSTRACT

The present invention provides a method of manufacturing a seat comprising a skin material, a cushioning pad and a seat frame by bonding the skin material and the cushioning pad to each other by using a reactive hot melt adhesive, wherein the method comprises a step of coating an adhesive to the cushioning pad, a step of assembling the seat frame to an attaching die in which a movable press bonding plate is disposed, a step of attaching a cushioning pad to the seat frame assembled to the attaching die, provisionally assembling the skin material to the surface of the cushioning pad on the side of coating the adhesive and then moving the press bonding plate thereby arranging the seat frame, the cushioning pad and the skin material on an attaching die main body, a step of applying heating by a heating die from the side of the skin material attached in the assembling step and a cooling/press bonding step of applying cooling under pressure after the heating step by a cooling die from the surface of the skin material to the attaching die.

5 Claims, 22 Drawing Sheets

METHOD OF MANUFACTURING A SEAT USING ADHESIVE

CROSS-REFERENCES TO RELATED APPLICATIONS

This application is related to copending application Ser. No. 07/924,517 filed Aug. 4, 1992, entitled "METHOD OF MANUFACTURING A SEAT USING ADHESIVE", in which the inventors are Akihiro Miyota and Shuichi Hashiguchi, assigned to the assignee of the present application.

BACKGROUND OF THE INVENTION

1. Field of the Invention

The present invention concerns a method of manufacturing, for example, a vehicle seat comprising a skin material, a cushioning pad and a seat frame and, more in particular, it relates to a method of manufacturing a seat using an adhesive capable of forming the seat during a state of assembling also to a seat frame when the cushioning pad and the skin material are integrated by using the adhesive.

2. Description of the Prior Art

In existent vehicle seats in which a skin material and a cushioning pad are bonded by using an adhesive, the skin material and the cushioning pad are disposed between upper and lower dies, and then integrally bonded by heating with the upper and lower dies while a hot melt adhesive in the form of an adhesion film or a solvent type adhesive is present between the skin material and the cushioning pad, and then the integrated skin material and cushioning pad are assembled together with a seat frame in a separate step.

In the step of using the hot melt adhesive, not only is a high heat resistance is required for the skin material and the cushioning pad but also a thermal load is applied to the skin material and the cushioning pad since a higher temperature is necessary for melting the adhesive for bonding. The solvent type adhesive involves a disadvantage in that the cushioning pad and the skin material are bonded during contact since adhesion has already been caused when coating with the adhesive.

For overcoming the foregoing problems in the adhesive, there has been proposed a technique of using a reaction type hot melt adhesive (refer, for example, to Japanese Patent Laid Open Hei 3-68391).

However, also in the technique proposed above, when the skin material and the cushioning pad are bonded, the skin material is disposed in either of the upper or the lower dies, while the cushioning pad is disposed in the other of the dies, and the seat is produced by coating an adhesive an at least one of the opposed surfaces of the cushioning pad and the skin material, followed by heating under pressure and, further, applying cooling on the side of the skin material.

In the technique as described above of placing the skin material and the cushioning pad respectively in the upper and lower dies for bonding them, it is necessary that assembling of the cushioning pad to the die and the assembling of the skin material to the die have to be conducted separately during the step of bonding the skin material and the cushioning pad. Further, when the skin material and the cushioning pad are separately placed in the upper and lower dies, it is necessary that one of the upper and the lower dies be cooled and heated in order to make the molding cycle satisfactory. Heating and cooling of one identical die after bonding the skin material and the cushioning pad makes the molding cycle longer since the identical die is heated and cooled, which decreases the production efficiency. Furthermore, since the cushioning pad and the skin material are heated, cooled and press-bonded by one identical die, lodging or lay down of fluffs in the napped skin material is caused.

Then, for integrally forming the skin material and the cushioning pad together with the seat frame, another separate step of attaching the integrated skin material and cushioning pad to the seat frame is required.

SUMMARY OF THE INVENTION

An object of the present invention is to provide a method of manufacturing a seat capable of integrating a cushioning pad and a skin material and in which a seat frame is also assembled and, in particular, a method of manufacturing a seat capable of being effectively joined during press bonding the skin material and the cushioning pad by using an adhesive and easy positioning thereby by joining the skin material to deep recesses of the cushioning pad.

Another object of the present invention is to provide a method of manufacturing a seat capable of shortening the molding cycle during a bonding step, preventing lodging or lay down in a skin material having napped fluffs and forming the seat while assembling with a seat frame, the cushioning pad and the skin material.

A further object of the present invention is to provide a method of manufacturing a seat using an adhesive capable of improving the production cycle and simplifying equipment.

The foregoing object of the present invention can be attained by a method of manufacturing a seat comprising a skin material, a cushioning pad and a seat frame by bonding the skin material and the cushioning pad to each other by using a reactive hot melt adhesive, wherein the method comprises the following steps:

coating an adhesive on the cushioning pad, assembling the seat frame to an attaching die in which a movable press bonding plate is disposed, attaching a cushioning pad to the seat frame which has been assembled to the attaching die, provisionally assembling the skin material to the surface of the cushioning pad on the side which has been coated with the adhesive and moving the press bonding plate thereby arranging the seat frame, the cushioning pad and the skin material on an attaching die main body, applying heat with a heating die from the side of the skin material which is attached during the assembling step and applying cooling under pressure after the heating step by a cooling die from the surface of the skin material to the attaching die.

Further, the foregoing object can be attained also by a method of manufacturing a seat comprising a skin material, a cushioning pad and a seat frame by bonding the skin material and the cushioning pad to each other by using a reactive hot melt adhesive, wherein the method comprises the steps of:

coating an adhesive to the cushioning pad, assembling a detachable press bonding plate to the seat frame, attaching the seat frame assembled with the press bonding plate to the cushioning pad, covering and provisionally assembling the skin material to the surface of the cushioning pad on the side of coating the adhesive, arranging the provisionally assembled skin material, the cushioning pad and the seat frame on an arranging die, applying heating by a heat die to the skin material, the cushioning pad and the seat frame arranged on the arranging die from the side of the skin material, applying cooling under pressure after the heating step by a cooling die from the surface of the skin material to the cushioning pad, and detaching said press bonding plate from said seat frame after the cooling/press bonding step.

In the present invention, the reactive hot melt can include, for example, those having active double bonds in the hot melt adhesion and curable by UV-rays and electron rays, those having epoxy groups and latent curing material and curable under heating, those having NCO groups and Si (OR)$_3$ groups and curable by water and those having SH groups and metal oxide catalyst and curable with oxygen. Urethane type wet curable adhesives being particularly preferred.

As has been described above, according to the present invention, the skin material, the cushioning pad and the seat frame can be molded simultaneously and bonding can be conducted while disposing the skin material and the cushioning pad between the cooling die and the press bonding plate.

Further, since the reactive hot melt adhesive is used as the adhesive, the adhesion becomes latent after curing of the adhesive and, accordingly, the cushioning pad and the skin material are not directly bonded during assembly and positioning is easy. That is, since the adhesive before press bonding the surface material and the cushioning pad and the bonding force is latent they are not bonded but can be positioned relative to each other. Then, even in a case where a deep recess or the like is present in the cushioning pad, the skin material can be bonded so it conforms to the shape of the recess by forcing it into the recess. Further, in the existent hot melt adhesive, use having adhesive of high softening point is required in a case where high heat resistance is required. However, since the heat resistance is caused in the reactive hot melt adhesive after the adhesion reaction, the melting temperature for the adhesive can be lowered (for example, to 60° C.). Since the temperature required for the bonding can be lowered, it is possible to prevent degradation, for example, lay down of the napped skin material.

Further, by disposing the heating die and the cooling die separately, the time required for heating and cooling can be shortened so as to reduce the production cycle. Since the press bonding is applied by the cooling die, press bonding is conducted under cooling so that lay down and the deterioration of the napped skin material can be prevented.

Further, when a detachable press bonding plate is used for the seat frame, it is only necessary to mount the heating die and the cooling die above an arranging die, with no particular requirement for additional peripheral mechanism, which can reduce problems and improve the reliability, as well as vertical moving stroke for pressing by the cooling die can be reduced. Further, since no additional mechanism are required, the weight of the entire apparatus is reduced and production is possible even with a lower pressing performance. Then, since a series of bonding steps such as heating, pressing and cooling can be conducted by previously assembling a plurality of press bonding plates with a plurality of seat frames, succeeding press bonding plate and seat frame can be joined even during heating, pressing and cooling, so that the step for joining the press bonding plate and the seat frame can be conducted separately not in synchronization with a series of bonding steps such as heating, pressing and cooling, to improve the productivity.

Various other advantages, structures and additional objects will become obvious to those skilled in the art with reference to the descriptions for preferred embodiments and illustrated embodiments.

DESCRIPTION OF PREFERRED EMBODIMENTS

FIG. 1 through FIG. 11 show a first embodiment according to the present invention. A seat in the present invention is formed in a state of assembling an air permeable skin material H and a cushioning pad P with a seat frame F. Description will be made in this embodiment of a vehicle seat back S shown in FIG. 1 as an example of the seat in this embodiment.

The apparatus used in the production method in this embodiment comprises an attaching die 21, a heating die 41 and a cooling die 51.

Figure 4:
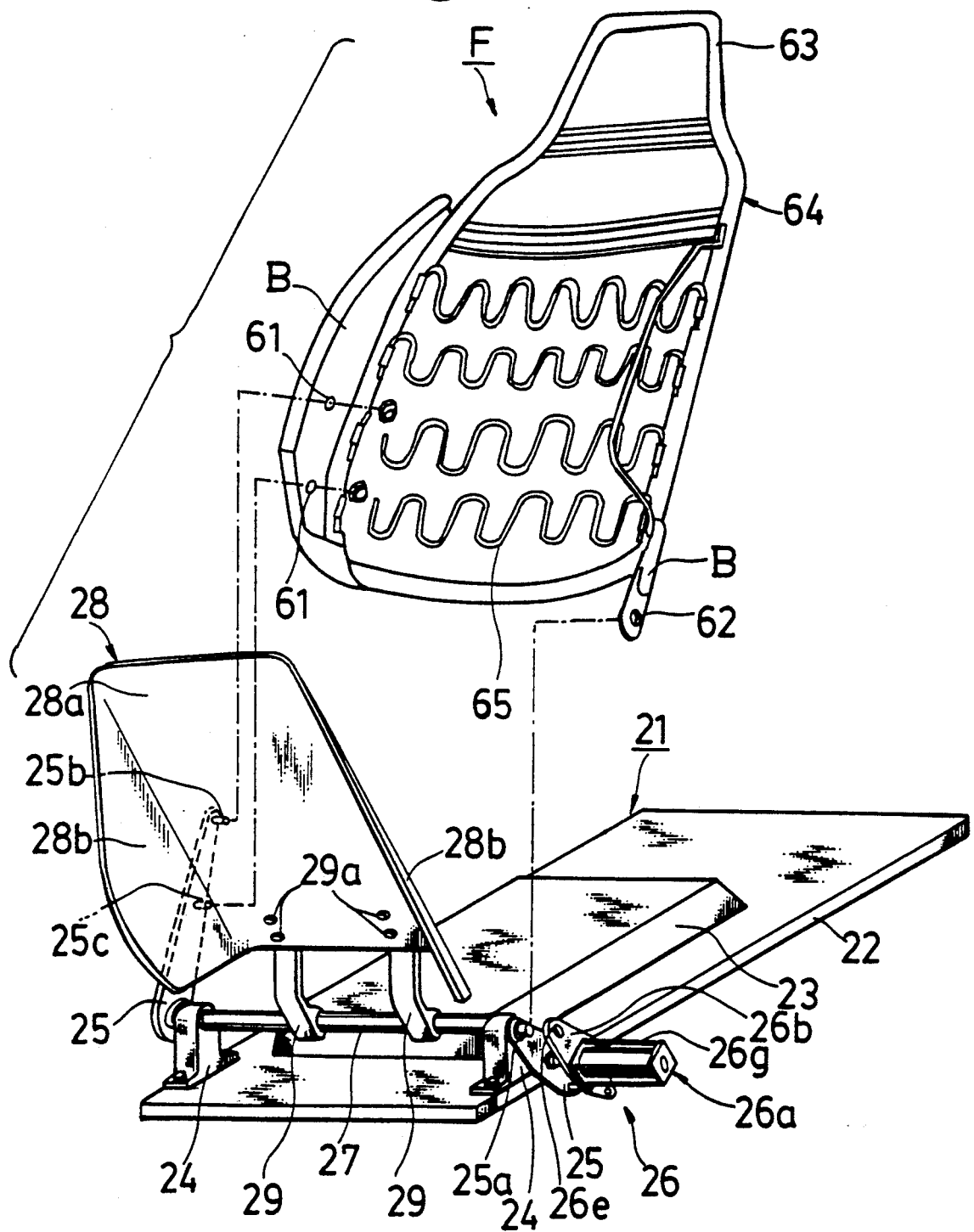
FIG. 4 is a perspective view of an attaching die and a seat frame used in the first embodiment.
Figure 5:
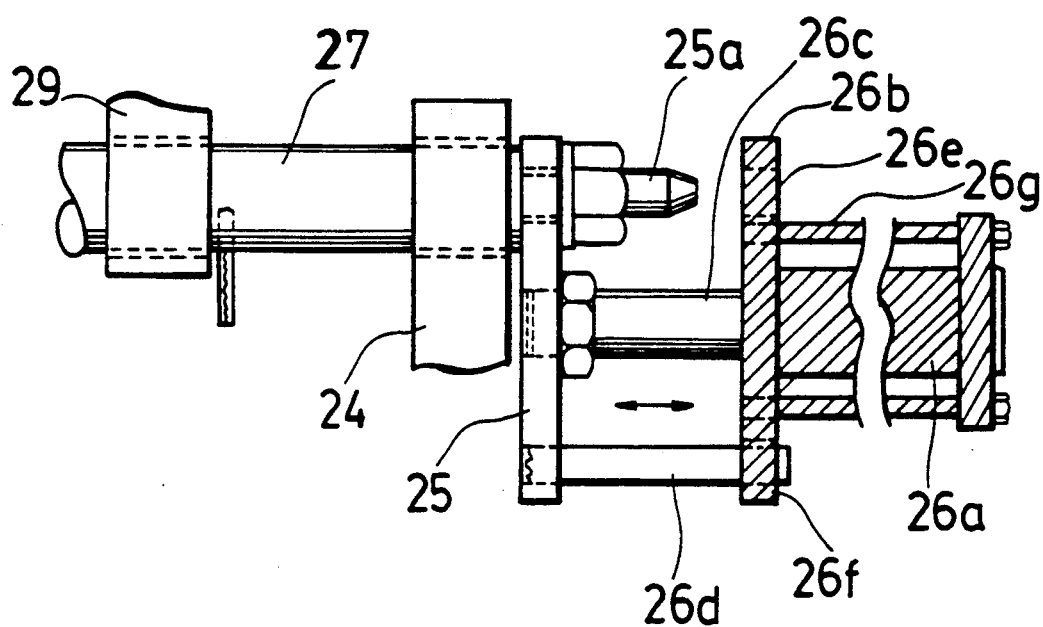
FIG. 5 is a constitutional view for a portion of a fixing means for the attaching die.
Figure 6:
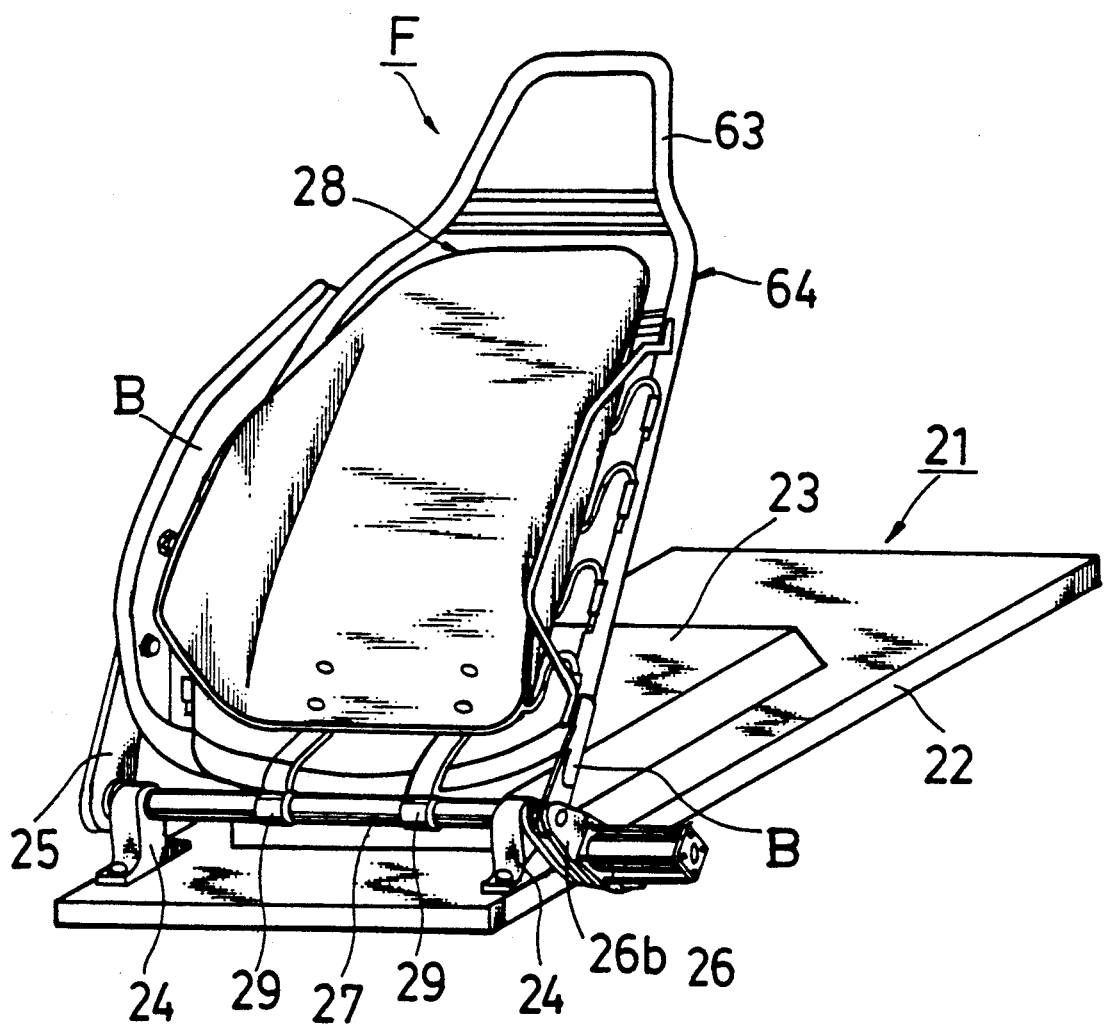
FIG. 6 is a perspective view showing the state of a seat frame attached to the attaching die.

The attaching die 21 in this embodiment comprises, as shown in FIG. 4 through FIG. 6, a support substrate 22 on which a frame receiving member 23 is disposed. A rotational shaft 27 is pivoted by means of support members 24 at one end of the support substrate 22. An engagement 25 is formed on each side of the rotational shaft 27 and bracket set pins 25a, 25b and 25c are connected to the engagement 25. The bracket set pins 25a, 25b and 25c are disposed so as to fit into holes 61, 61, 62, respectively, formed in a bracket B to be described later. A fixing means 26 is formed to the rotational shaft 27.

The fixing means 26 in this embodiment comprises an air cylinder main body 26a, an engaging plate 26b, a rod 26c and a guide rod 26d, and the air cylinder main body 26a and the engaging plate 26b are connected integrally by means of a connection member 26g. A connection hole 26e and a slide hole 26f are perforated in the engaging plate 26b. The connection hole 26e engages the bracket set pin 25a, while the guide rod 26d is slidably disposed through the slide hole 26f. The top end of the rod 26c of the air cylinder main body 26a is secured to the engagement 25.

Attaching members 29, 29 are integrally connected to the rotational shaft 27 in this embodiment as shown in FIG. 6, and a press bonding plate 28 is attached integrally to the attaching members 29, 29 by attaching means 29a such as bolts and nuts. The press bonding plate 28 can be replaced by detaching the attaching means 29a, and detaching the press bonding plate 28 from the attaching members 29.

The press bonding plate 28 in this embodiment comprises a central portion 28a and extended portions 28b, 28b on both sides of the central portion 28a and it is so formed as to conform to the rearface of the cushioning pad P (that is, the surface on the side of the seat frame F) and is situated so as on the inside of the frame of the seat frame F.

Figure 3:
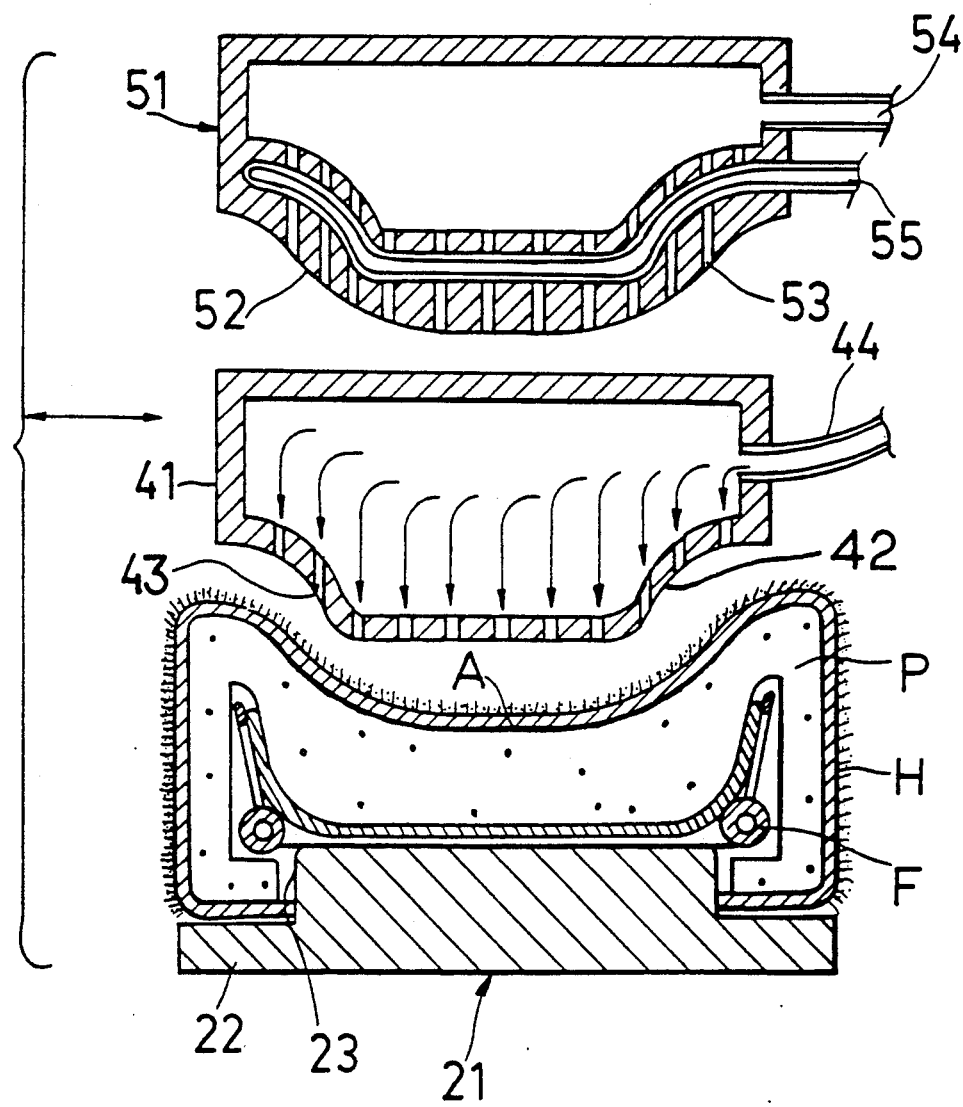
FIG. 3 is a schematic structural view illustrating a production apparatus as a first embodiment.

The heating die 41 in this embodiment is in a form of a hollow box which is slidable in the right and left directions (FIG. 3). The die face 42 of the heating die 41 has a surface which conforms the shape to the surface of the seat back S (shape of the cushioning pad P and the skin material H). A plurality of through holes 43 are formed in the die face 42 as shown in FIG. 3. A connection pipe 44 is provided a predetermined position on the side of the heating die 41, so that steam or hot air may be introduced from the connection pipe 44 to the heating die 41.

The cooling die 51 in this embodiment is in the form of a box, in which a die face 52 has a shape which conforms to the shape of the surface of the seat back S (shape on the side of the skin material H). A plurality of through holes 53 are formed in the die face 52 and a connection pipe 54 and a cooling water pipe 55 are provided at predetermined positions on the side of the cooling die 51. Cooling water is circulated through the cooling water pipe 55 and air is introduced from the connection pipe 54, and the cooling air flows out of the through holes 53.

Figure 1:
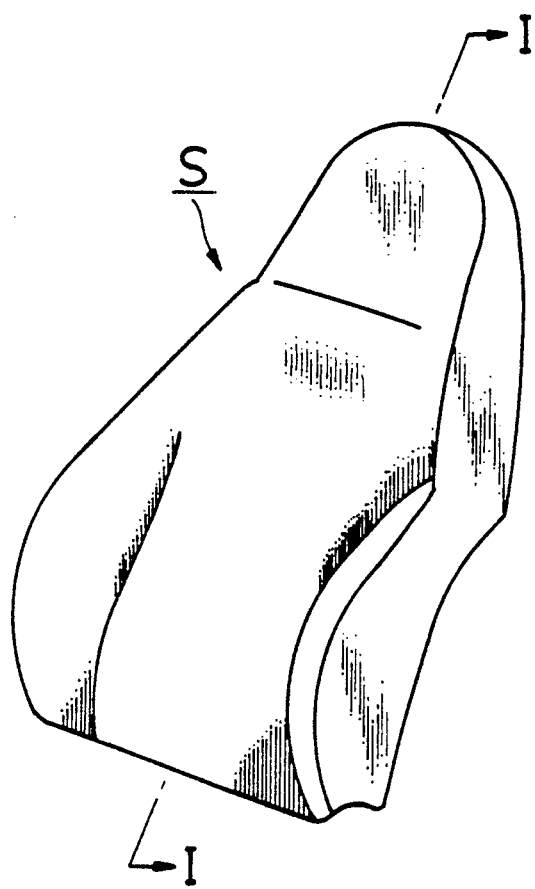
FIG. 1 is a perspective view of a seat back as a seat illustrating a preferred embodiment.
Figure 2:
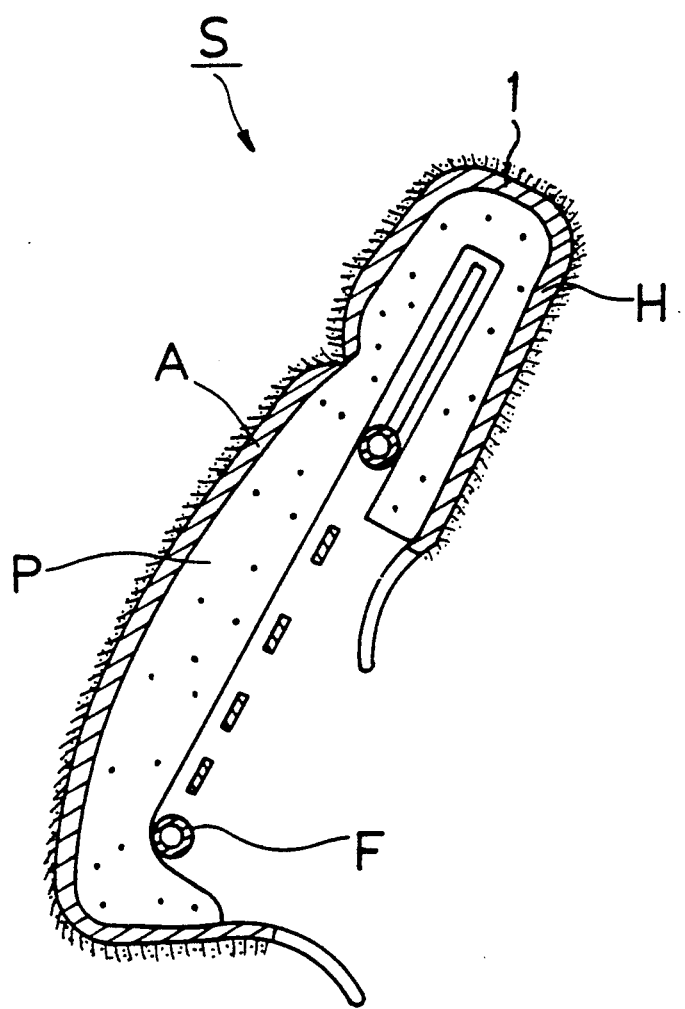
FIG. 2 is a cross sectional taken along line I—I in FIG. 1.

As shown in FIG. 2, the seat back S in this embodiment uses a skin member 1 having a bag-like shape in which a cushioning pad P is covered with a skin material H. A seat frame F is disposed at the inside of the bag-shaped skin member 1.

The seat frame F in this embodiment comprises a frame 64 mainly consisting of a pipe and, as shown in FIG. 4, a plurality of corrugating springs 65 are attached to frame member 64. In the frame member 64, an attaching bracket B and a plate-like attaching bracket B which also serves as a side support are formed, respectively, on the lower free end and a head rest support portion 63 is formed on an upper central portion. Further, two holes are formed in the plate-like bracket B (on the left in FIG. 4), and a hole 62 is formed in the other bracket B (on the right in FIG. 4). The cushioning pad P and the skin material H are integrally bonded by means of the adhesive A.

The seat back S is produced as described below. That is, the seat back is produced by coating the adhesive A to the cushioning pad P. The seat frame F is attached to the attaching die 21 to which a movable press bonding plate 28 is mounted. The cushioning pad P is attached to the seat frame F. The skin material H is provisionally assembled to the surface of the cushioning pad P on the side of the coating of adhesive. Then the press bonding plate 28 is moved to mount the seat frame F, the cushioning pad P and the skin material H on the attaching die main body. Heat is applied with the heating die 41 from the side of the skin material H which is attached during the assembly step During a cooling/press bonding step for cooling under pressure is applied from the surface of the skin material H to the attaching die 21 by the cooling die 51 after the heating step. Then the seat back S comprising the integrated seat frame F, cushioning pad P and skin material H are detached from the attaching plate 21 after the cooling/press bonding step.

Figure 7:
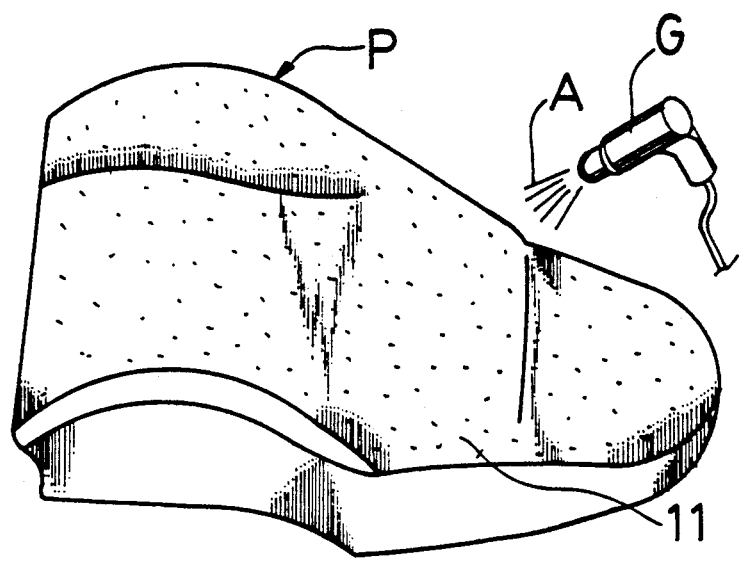
FIG. 7 is an explanatory view for the state of coating an adhesive on a cushioning pad.

In the coating step of coating the adhesive A to the cushioning pad P in this embodiment, as shown in FIG. 7, a molten reactive hot melt adhesive A is uniformly coated on the joining surface 11 of the cushioning pad P with the skin material H by a spray gun G. As the reactive hot melt adhesive A used in this embodiment, there can be mentioned, for example, those providing actual double bonds during hot melt bonding and curable by UV-rays and electron rays, those having epoxy groups and latent curing material and curable under heating, those having NCO groups and Si (OR)$_3$ groups and curable under water and those having SH groups and metal oxide catalyst and curable by oxygen, the urethane type wet curing adhesive A being particularly preferred. More specifically, a wet curable hot melt adhesive A mainly composed of a polyester type isocyanate prepolymer which is commercially available can be used (for example, "Hibon 4832", registered trade mark, for the products manufactured by Hitachi Kasei Polymer Co.).

When the reactive type hot melt adhesive A is coated on the cushioning pad P, since the adhesive A is cooled to solidify just after the coating, movement and provisionally assembling of the skin material H are possible. Further, it is not always necessary to coat the adhesive A over the entire surface of the cushioning pad P but it may suffice on coat the adhesive only to a reversed R portion (recess) of the cushioning pad P.

Referring to the assembling of the seat frame F, as shown in FIG. 4 through FIG. 6, the bracket set pins 25a, 25b, 25c are fit into the holes 61, 61, 62 for the brackets B on both sides of the seat frame F, respectively. In this case, the press bonding plate 28 is situated at least at an inner region of the seat frame F to be attached.

Then, the air cylinder main body 26a is actuated on the bracket B on the side of the bracket set pin 25a which fits into the hole 62, and the engaging plate 26b is moved toward the engagement 25 with the rod 26c from the air cylinder main body 26a, thereby securing the bracket B to the rotational shaft 27.

As shown in FIG. 6, the rotational shaft 27 is fixed by the fixing means 26, and the seat frame F is engaged by way of the rotational shaft 27 and the bracket set pins 25a, 25b and 25c are fixed. FIG. 6 shows such a state.

Figure 8:
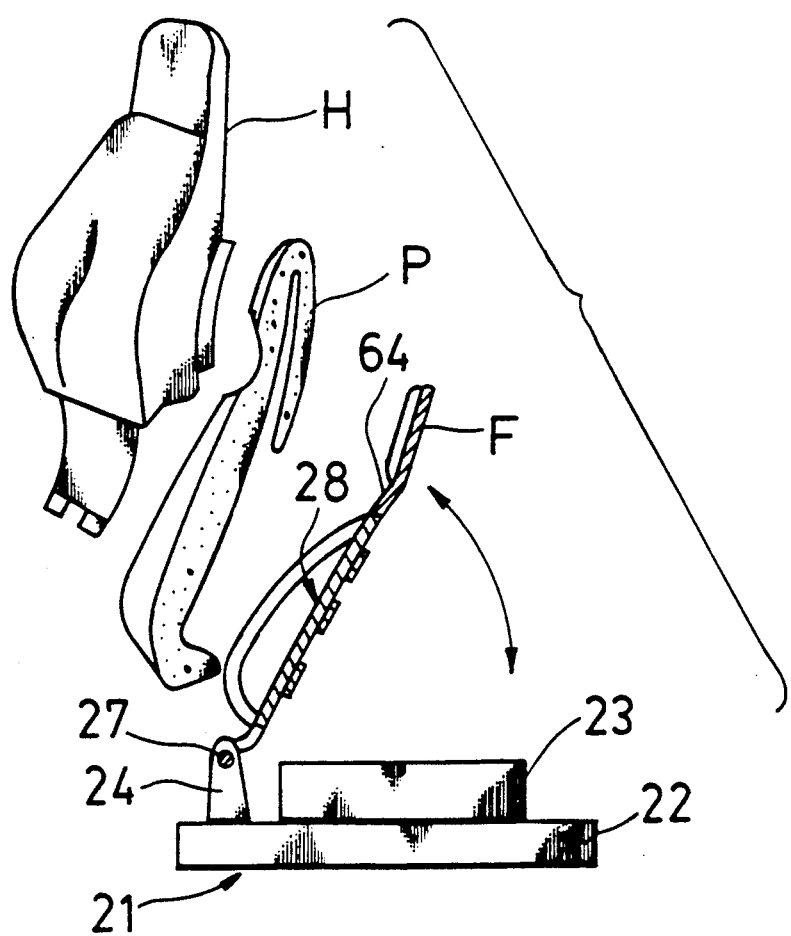
FIG. 8 is an explanatory view for the state of attaching the cushioning pad and the skin material to the attaching die.

Then, as shown in FIG. 8, the cushioning pad P is attached to the seat frame F assembled to the attaching die 21 and the skin material H is then assembled provisionally to the surface of the cushioning pad P on the side of the coating the adhesive. In this case, the terminal end of the skin material H is secured by means of a securing means such as a needle or a hook (not illustrated). In this case, it is preferably to attach the cushioning pad P to the seat frame F with gum arabic, hot melt adhesive or the like coated on the rearface.

In this embodiment, the skin material H is previously formed so as to conform to the shape of the cushioning pad P but skin material which has not been preformed may also be used. Further, it has been explained that the cushioning pad P is attached to the seat frame F which is assembled with the attaching die 21 and, further, the skin material H is successively provisionally assembled to the surface of the cushioning pad P on the side of the coating the adhesive. However, the skin material H is assembled provisionally to the cushioning pad P and, subsequently, the cushioning pad P and the skin material H thus provisionally assembled may be assembled to the seat frame F.

Figure 9:
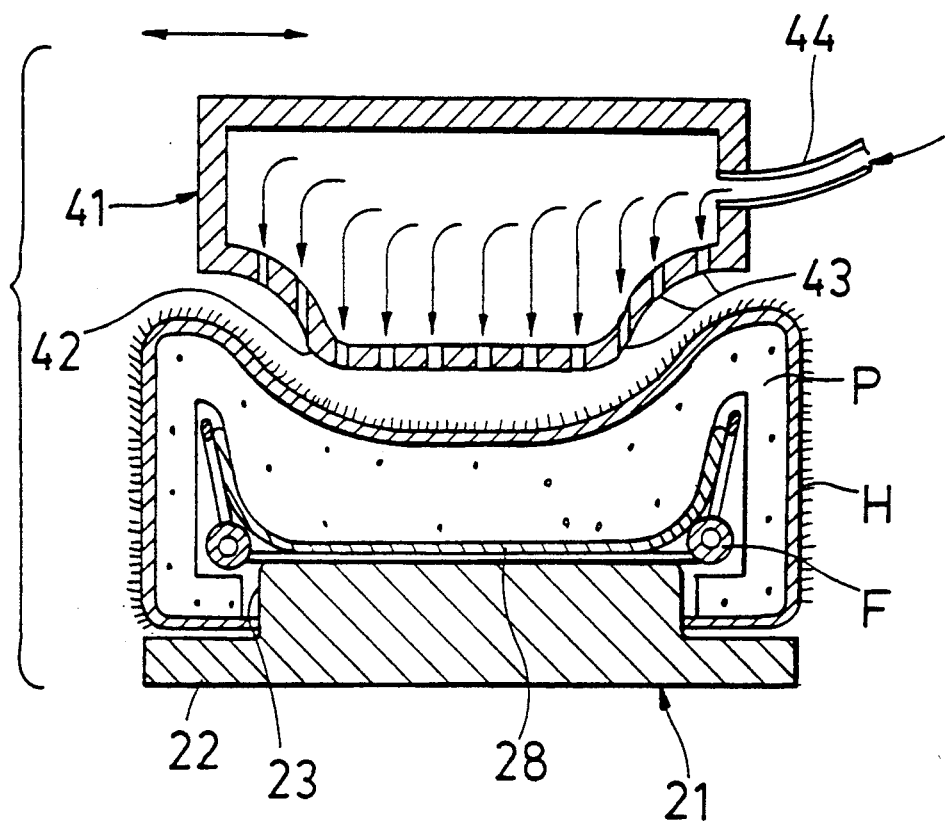
FIG. 9 is an explanatory view for the state of heating.

Then, as shown in FIG. 9, during a heating step the skin material H, the cushioning pad P and the seat frame F are attached by applying heat from the side of the skin material H with the heat die 41. That is, heating can be applied from the side of the skin material H by approaching the heating die 42 to the provisionally assembled cushioning pad P and skin material H, by which the reactive hot melt adhesive A coated to the cushioning pad P is reactivated and melted. For moving the heating die 42 near to the skin material H in this embodiment, one or both the heating die 42 and the attaching die 21 may be moved by well-known means.

After melting the reactive hot melt adhesive A in this way, the supply of steam or hot air from the heating die 42 is stopped and then the heating die 42 is moved away. If a buffer material such as a skeleton foam is disposed on the lower surface of the through holes 43 in the heating die 42, the skin material H and the cushioning pad P can be heated uniformly to prevent lay down of napped fluffs.

Figure 10:
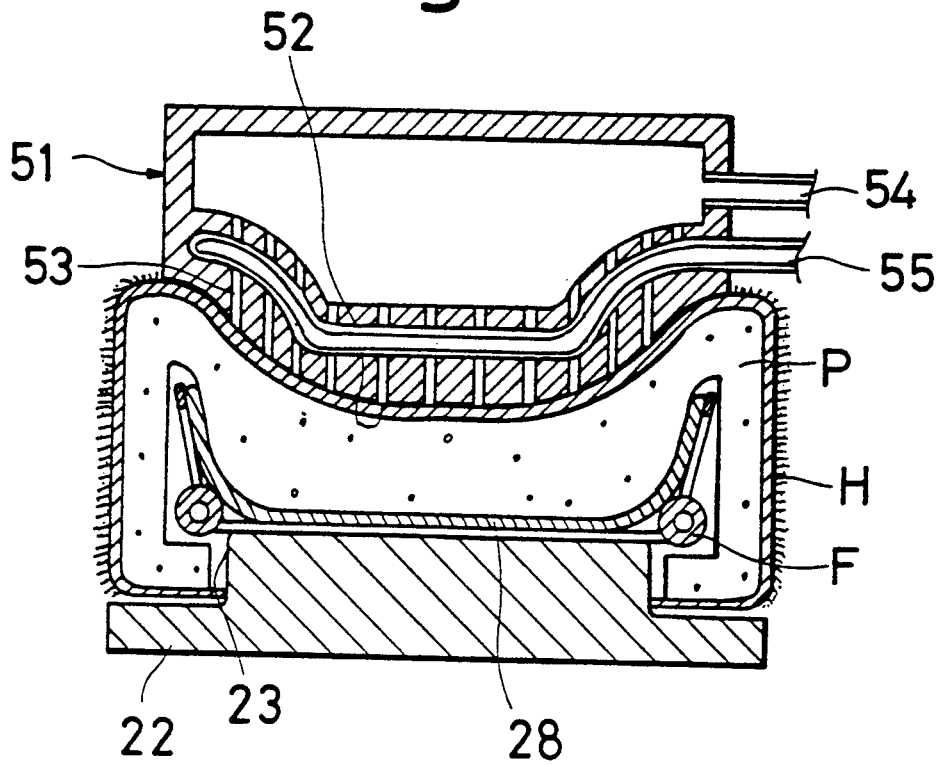
FIG. 10 is an explanatory view for the state of cooling under pressure.
Figure 11:
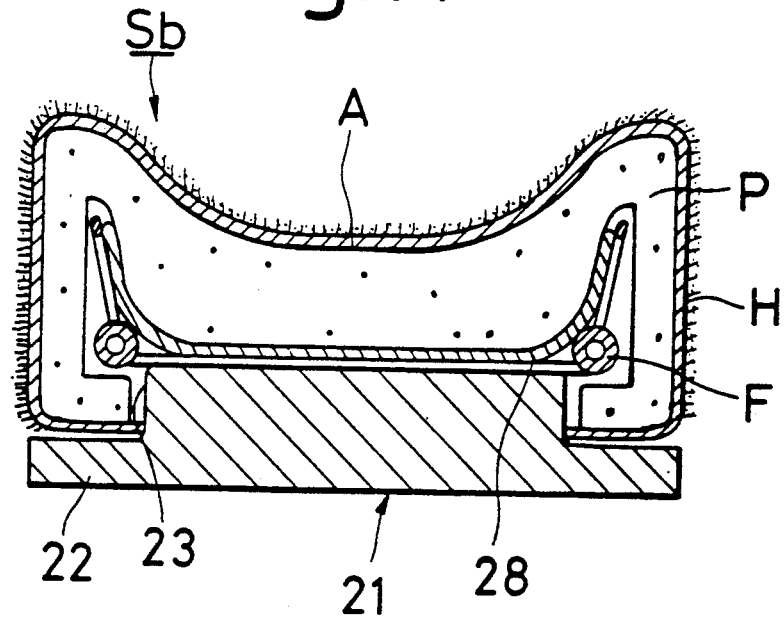
FIG. 11 is an explanatory view for the state in which the bonding step is completed.

Then, subsequent to the heating step, a cooling/press bonding step 50 occurs with the cooling die 51 as shown in FIG. 10 by applying cooling under pressure from the surface of the skin material to the side of the cushioning pad P. Namely, the cooling die 51 is clamped and urged with a predetermined pressure to the cushioning pad P and air flows out from the through holes 53 for cooling. In this case, since the press bonding plate 28 has a shape conforming to the shape at the rearface of the cushioning pad P, the cushioning pad P can be seized and pressed effectively between the cooling die 51 and the press bonding plate 28 thereby reliably bonding the skin material H and the cushioning pad P.

The cooling die 51, illustrated blows air into the cooling die but, it suck air instead. If air is sucked, excess steam present in the skin material H and the cushioning pad P can be removed from the side of the skin material for a case where steam is used in the heating die.

Then, the seat back S comprising integrated skin material H, the cushioning pad P and the seat frame F is taken out of the attaching die 31.

Figure 12:
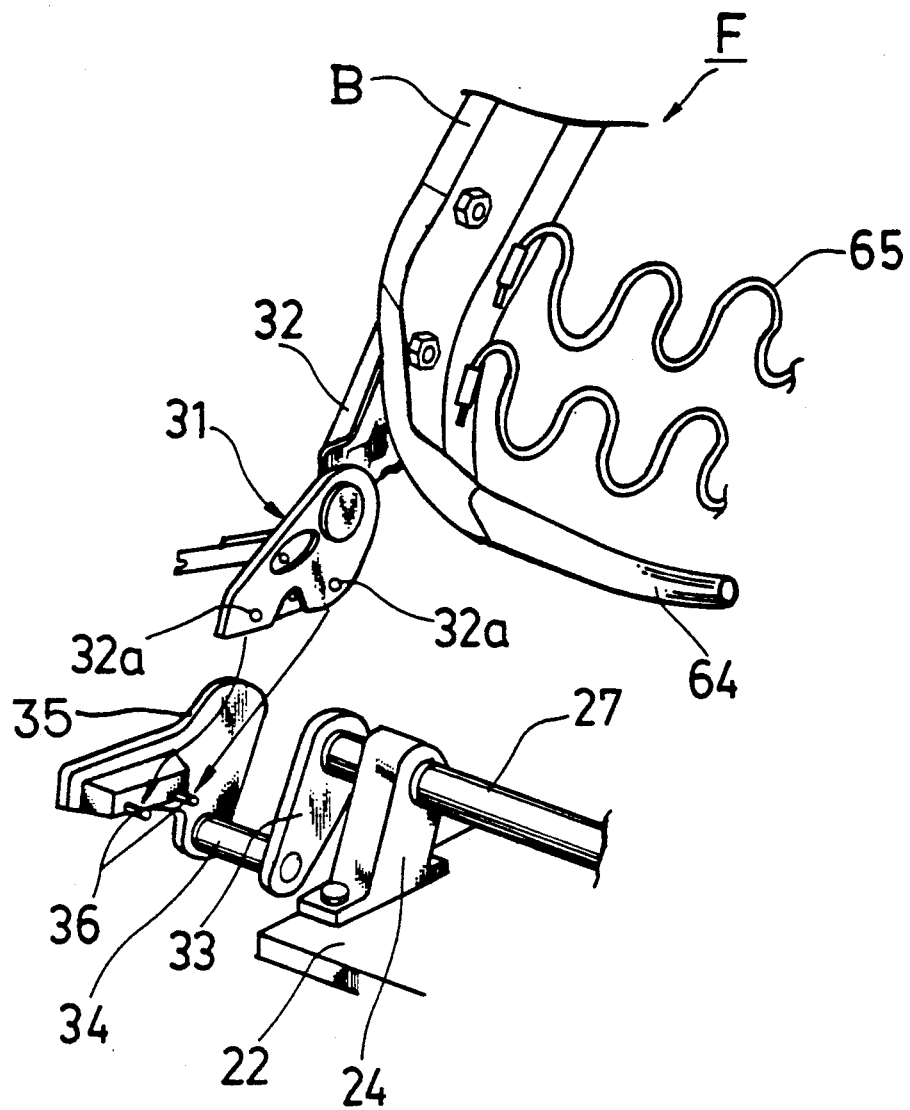
FIG. 12 is an explanatory view for a different example of attaching the seat frame and the attaching die.
Figure 13:
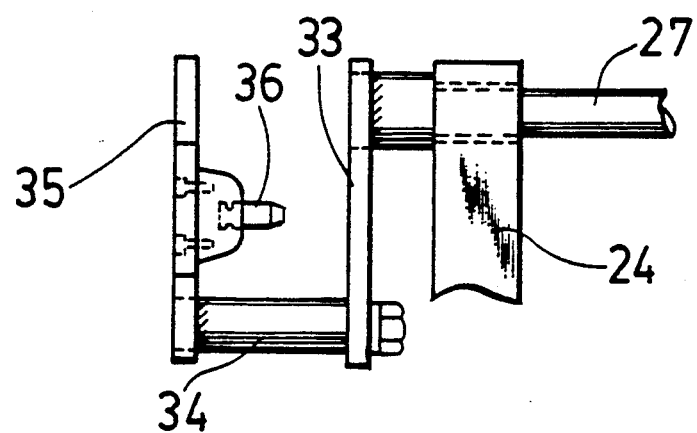
FIG. 13 is a constitutional view for a portion of the attaching die in a case of attaching the seat frame shown in FIG. 12.

FIG. 12 illustrates another embodiment of the seat frame F, in which a reclining bracket 31 is attached to the seat frame F. As shown in FIG. 12, the reclining bracket 31 is connected by way of a connection member 32 to the bracket B of the seat frame F. Attaching holes which are to be connected with a vehicle body (not illustrated) are disposed in the reclining bracket 31. On the other hand, the engagement of the attaching die 21 is replaced with a reclining engagement 35. That is, a connection plate 33 is connected to the end of the rotational shaft 27, a connection rod 34 is connected to the connection plate 33 and an engagement 35 is connected to the connection rod 34. The engagement 35 in this embodiment is so adapted that bracket set pins 36, 36 are aligned with attaching holes 32 disposed in the reclining bracket 31, and the bracket set pins 36, 36 fit into the attaching holes 32, 32 of the reclining bracket.

Figure 14:
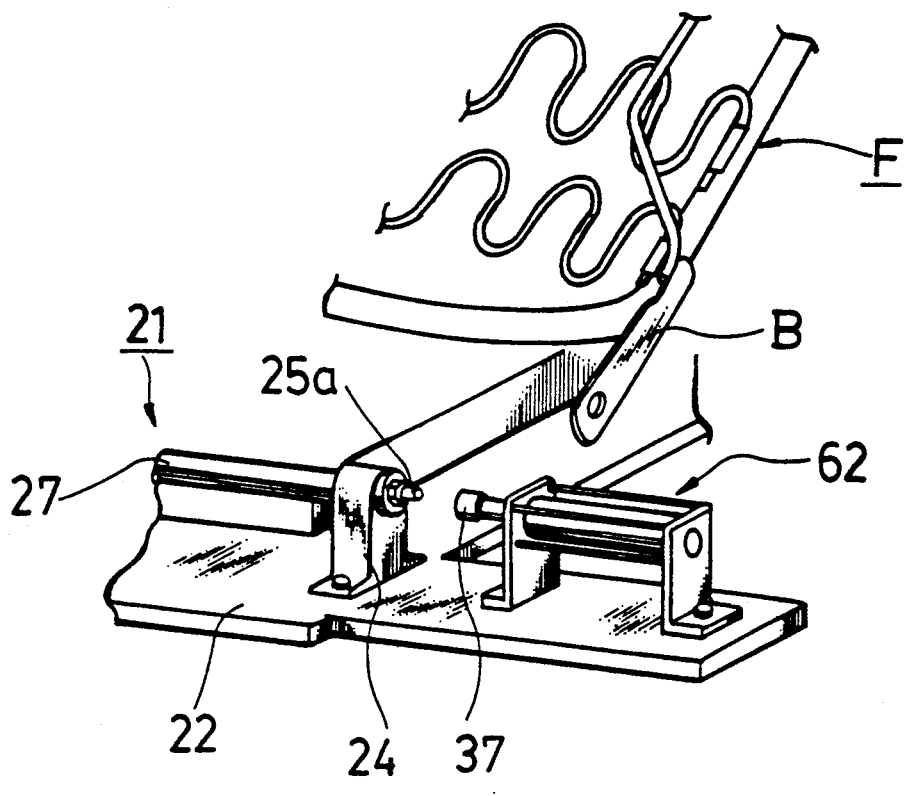
FIG. 14 is an explanatory view of a different example of fixing means.
Figure 15:
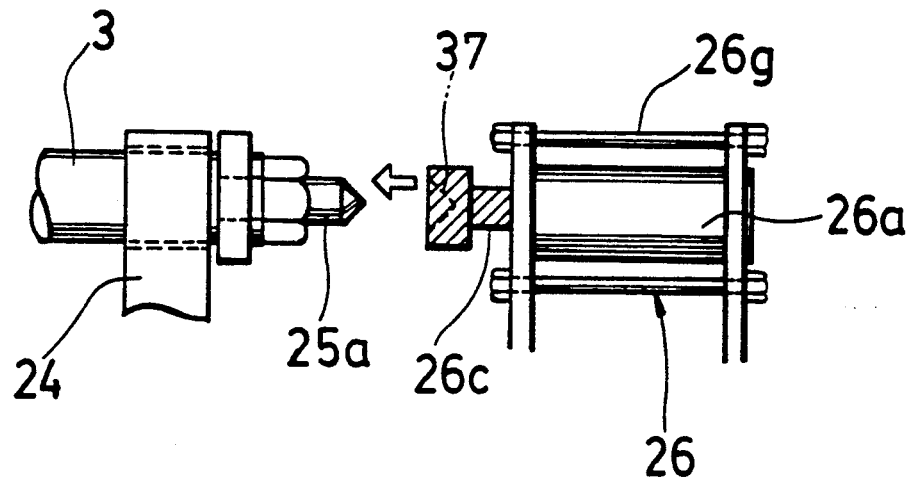
FIG. 15 is an explanatory view for the operation of the fixing means shown in FIG. 14.

Further, as shown in FIGS. 14 and 15, the fixing means comprise an engaging recess 37 at the end of the rod 26c of the air cylinder and, after fitting the bracket set pin 25a into the hole 62 of the bracket B, the engaging recess 37 is urged from the side of the top end of the bracket set pin 25a to join the members.

Figure 16:
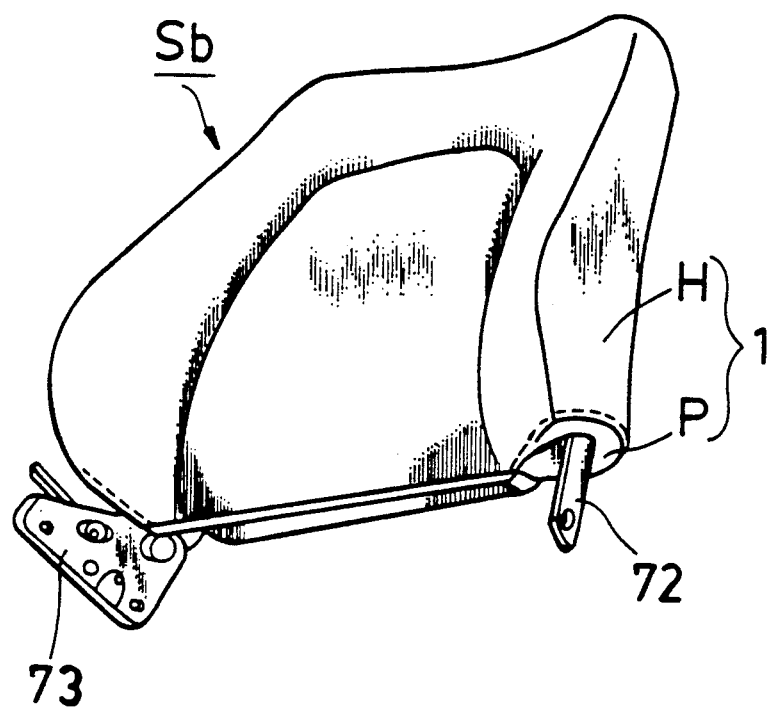
FIG. 16 is a perspective view of a seat back as a seat illustrating another embodiment according to the present invention.
Figure 17:
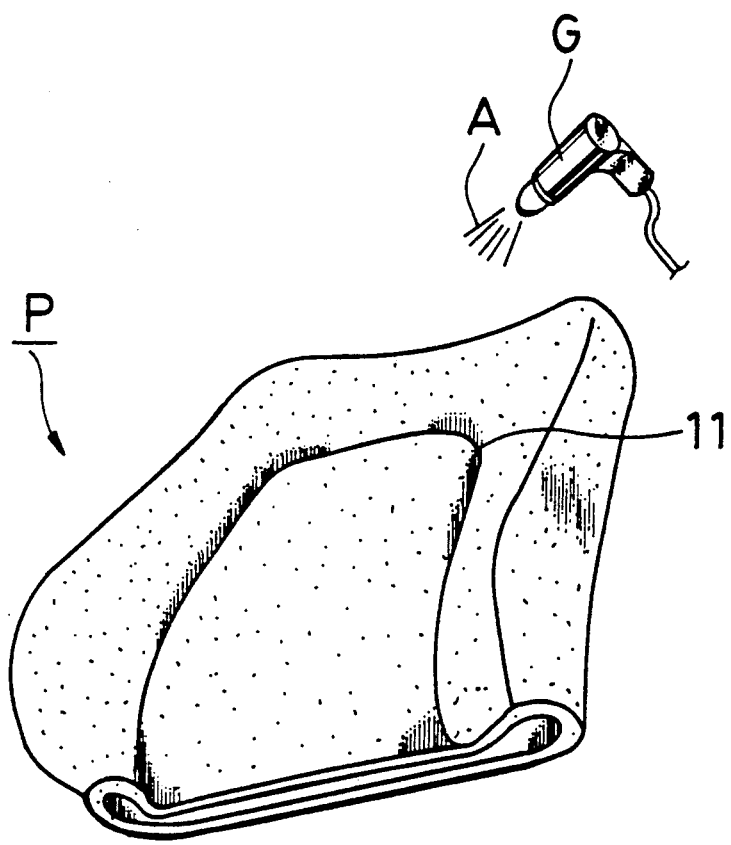
FIG. 17 is a view illustrating coating of the adhesive.
Figure 18:
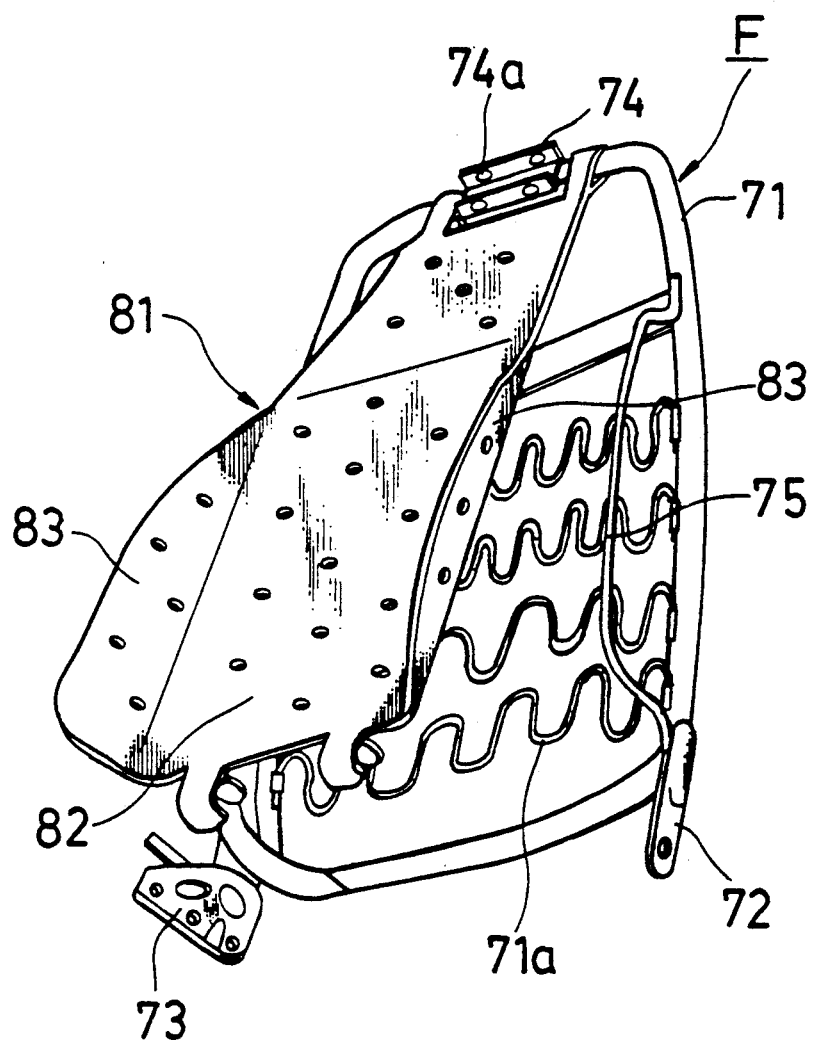
FIG. 18 is an explanatory view of an engaged state between a seat frame and a press bonding plate.
Figure 19:
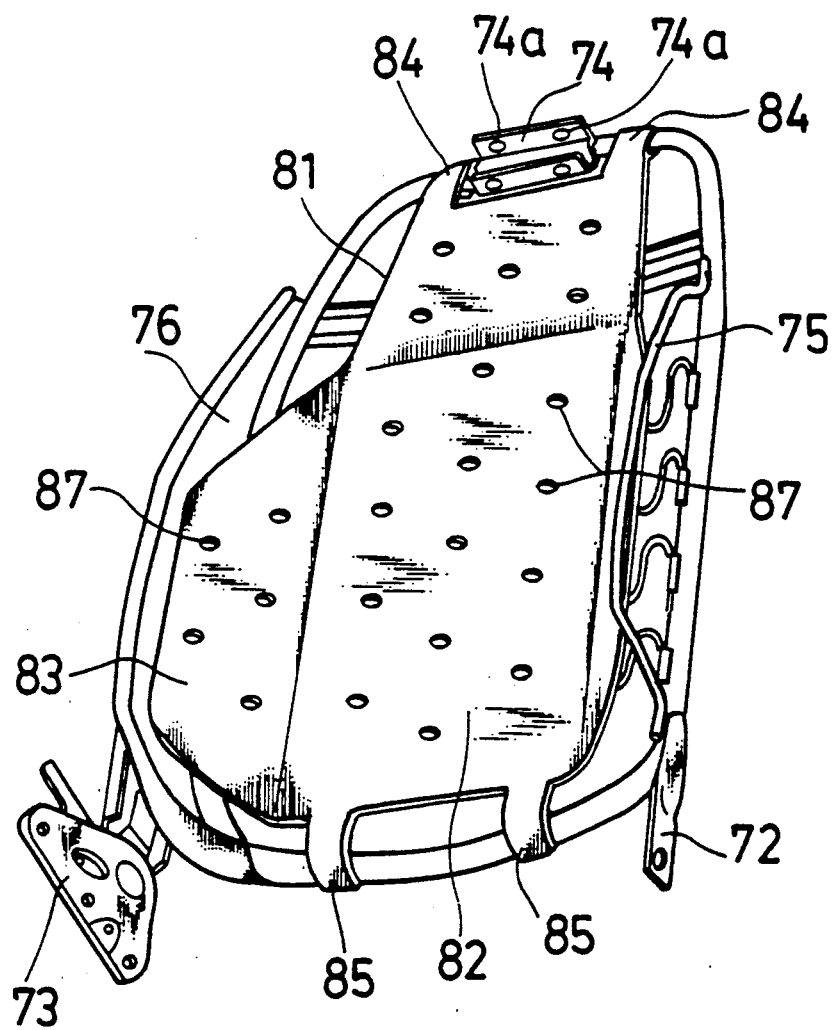
FIG. 19 is a perspective view of a state in which the press bonding is attached to the seat frame.

FIG. 16 through FIG. 27 show another embodiment according to the present invention. As shown in FIG. 16, a seat back Sb in this embodiment uses a skin member 1 formed in a bag-like shape in which a cushioning pad P is covered with a skin material H. A seat frame F is disposed at the inside of the bag-shaped skin member 1. The seat frame F in this embodiment comprises a frame member 71 mainly composed of a pipe and, as shown in FIG. 18, a plurality of corrugating springs 71a extend along the frame member 71. In the frame member 71, attaching brackets 72, 73 are formed on both lower sides, while a head rest support metal 74 is formed in the upper portion of the frame member 71.

In the head rest support metal 74 in this embodiment, holes 74a, 74a for mounting a head rest stay (not illustrated) are formed. Further, extended portions 75, 76 for forming side supports are formed on the right and left of the seat frame F, and the extended portion 75 on one side is formed with a pipe and the extended portion 76 on the other side is formed with a plate. The extended portion 76 comprising the plate is connected with the attaching bracket 73 and the bracket 73 forms the reclining mechanism in this embodiment. The cushioning pad P and the skin material H are formed integrally and are bonded with the adhesive A.

The method of producing the seat back Sb using the adhesive A in this embodiment comprises the following steps. The adhesive to the cushioning pad. The detachable press bonding plate 81 is assembled to the seat frame F. The frame F assembled with the press bonding plate 81 is attached to the cushioning pad P. The skin material H is provisionally assembled to the surface of the cushioning pad on the side of coating the adhesive. The provisionally assembled skin material H, the cushioning pad P and the seat frame F are mounted on an arranging die 91. Heating is applied to the skin material H, the cushioning pad P and the seat frame F which are arranged on the arranging die 91 from the side of the skin material H by the heating die 41. Cooling and press bonding occur by applying cooling under pressure with the cooling die subsequent to the heating step from the surface of the skin material H to the cushioning pad P. Then detaching the press bonding plate 81 from the seat frame F after the cooling/press bonding step.

Figure 24:
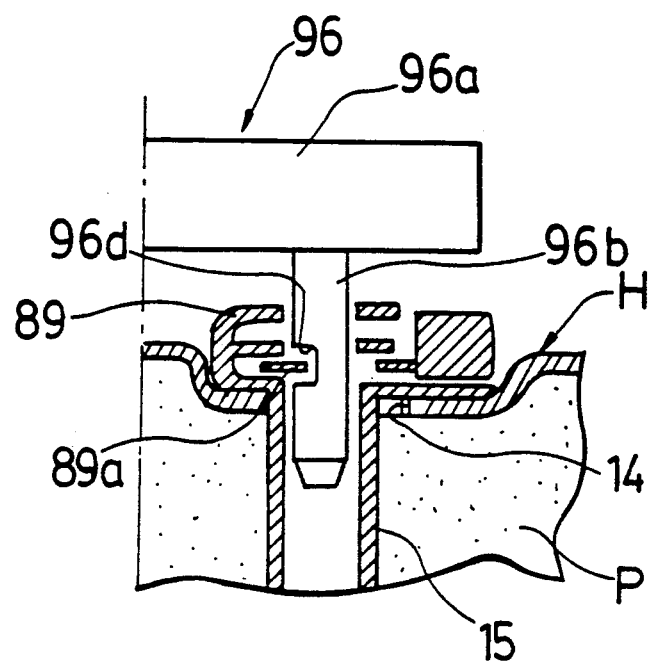
FIG. 24 is a partial cross sectional view for illustrating the operation of one of positioning members.

As shown in FIG. 17, the cushioning pad P in this embodiment is in the shape of a hollow bag-shape opened at the lower end, in which two holes 15, 15 for mounting a head rest stay are formed at the upper end (refer to FIG. 24). Then, as shown in FIG. 17, during the step of coating the adhesive A to the cushioning pad P, a molten reactive hot melt adhesive A is uniformly coated to the joining surface 11 of the cushioning pad P with the skin material H by a spray gun G.

As the reactive hot melt adhesive A used in this embodiment, the same commercially available moisture curable hot melt adhesive A mainly composed of the polyester isocyanate prepolymer as in the previous embodiment can be used (for example, "Hibon 4832", registered trademark for the products manufactured by Hitachi Kasei Polymer Co.). Also in this embodiment, since the reactive hot melt adhesive A is cooled to solidify just after the coating in the same manner as in the previous embodiment, the adhesive A shows no adhesion which allow movement. Since the cushioning pad P and the skin material H are not adhered even when the cushioning pad P is covered with the skin material H, provisional assembling is possible. Then, the covered skin material H can be moved while being adhered properly in position for the cushioning pad P. Further, it is not always necessary to coat the adhesive A over the entire surface of the cushioning pad P but it may suffice to coat the adhesive only on the concave portion (recess) of the cushioning pad P or only in the deep recesses thereof.

Figure 22:
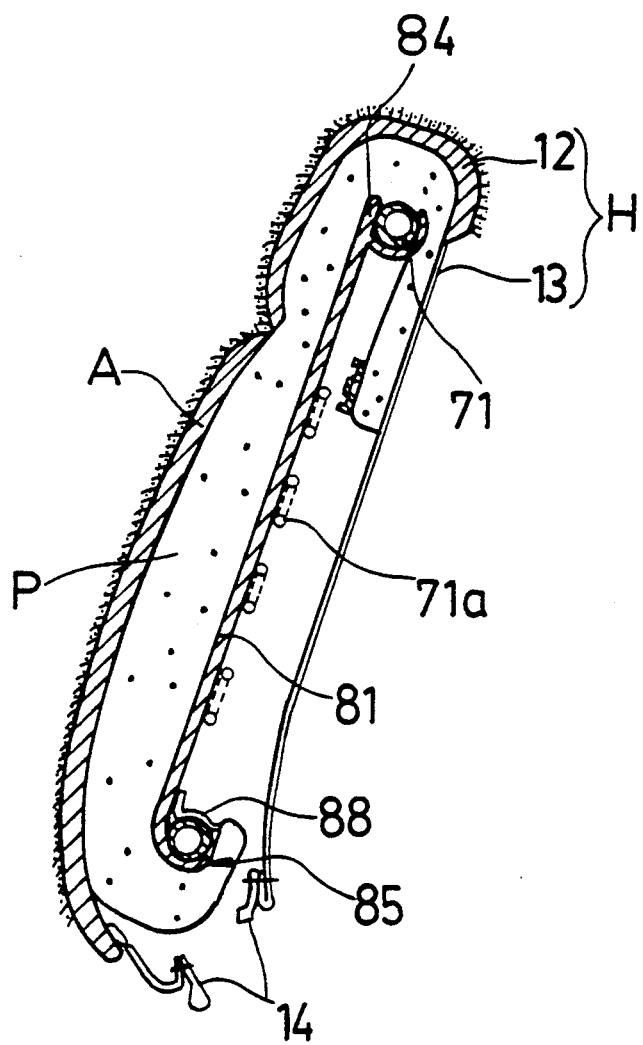
FIG. 22 is a cross sectional view illustrating the state of mounting a seat frame attached with the press bonding plate in the skin material.

After coating the adhesive A to the surface of the cushioning pad P as described above, the skin material H is placed thereon. The skin material H, as shown in FIG. 22, has a bag-like shape and comprises a napped skin 12 constituting the sitting surface and a not napped skin material 13 on the back side which is connected with the skin material 12. Trim holes 14 are attached to respective terminal ends. Further, two holes 14 (only one of them is illustrated in FIG. 22) are formed at the upper end so that a head rest stay can be mounted.

In this embodiment, after covering the skin material H over the cushioning pad P, a positioning guide 89 for the head rest (not illustrated) is mounted and aligned with the hole 15 in the cushioning pad P and the hole 14 in the skin material H.

In this embodiment, the skin material H is previously formed so as to conform to the shape of the cushioning pad P but a now preformed skin material H may also be used.

The detachable press bonding plate 81 in this embodiment is disposed detachably to the seat frame F and of such a size as to be disposed within the inner region of the seat frame F. As shown in FIG. 18 through FIG. 21, the press bonding plate 81 has a central portion 82 and extended portions 83, 83 on both sides of the central portion 82 being located at positions inwardly of the side supports and they are so formed so as to conform to the shape of the rear face of the cushioning pad P (that is, the surface on the side of the seat frame F) and cover the inner region of the frame member 71 of the seat frame F. Engagements 84, 85 are each formed at two portions in the upper and the lower positions. A plurality of holes 87 are formed over the entire surface of the press bonding plate 81. Air communication with the cushioning pad P can be ensured by such a plurality of holes 87 in the press bonding plate 81.

Figure 20:
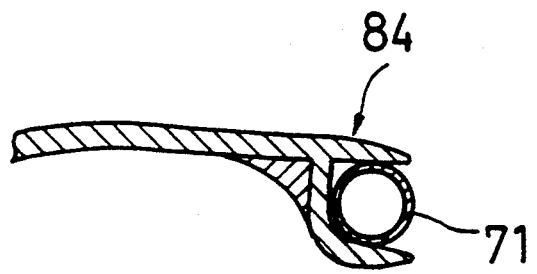
FIG. 20 is a partial cross sectional view illustrating the engaged state for one of the seat frame and the press bonding plate.
Figure 21:
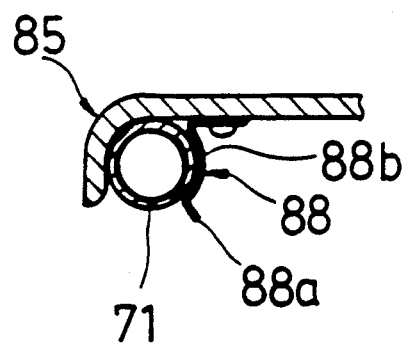
FIG. 21 is a partial cross sectional view illustrating the engaged state for the other of the seat frame and the press bonding plate.

The engagement 84 at the upper end in this embodiment has a U-shaped cross section as shown in FIG. 20, while the engagement 85 at the lower end has an L-shaped configuration as shown in FIG. 21, and a plate-like spring 88 is disposed at a gap corresponding to the pipe width of the seat frame F. The spring 88 diverges at the end 88a and is rounded at an intermediate portion 88b so that it conforms to the shape of the pipe.

When the press bonding plate 81 is assembled to the seat frame F, the engagement 84 at the upper end and the seat frame F are joined at first to rotationally urge the engagement 85 at the lower end of the press bonding plate 81 toward the side of the seat frame F around the engagement 84 at the upper end as a center. By this urging, the end 88a of the spring 88 opens, so that the engagement 85 at the lower end is connected with the seat frame F and the press bonding plate 81 is disposed in the inner region of the seat frame F. The seat frame F thus attached with the press bonding plate 81 is mounted to the cushioning pad P.

The step of mounting the seat frame F which is attached with the press bonding plate 81 in the cushioning pad P may be done after covering the cushioning pad P with the skin material H as described above or it may be done before covering. In a case where the seat frame F is mounted in the cushioning pad before covering of the skin material H, the skin material H is covered subsequently. As described above, the skin material H is covered over the surface 11 of the cushioning pad P on the side of the coating the adhesive, and the skin material H, the cushioning P and the seat frame F are assembled provisionally.

Figure 23:
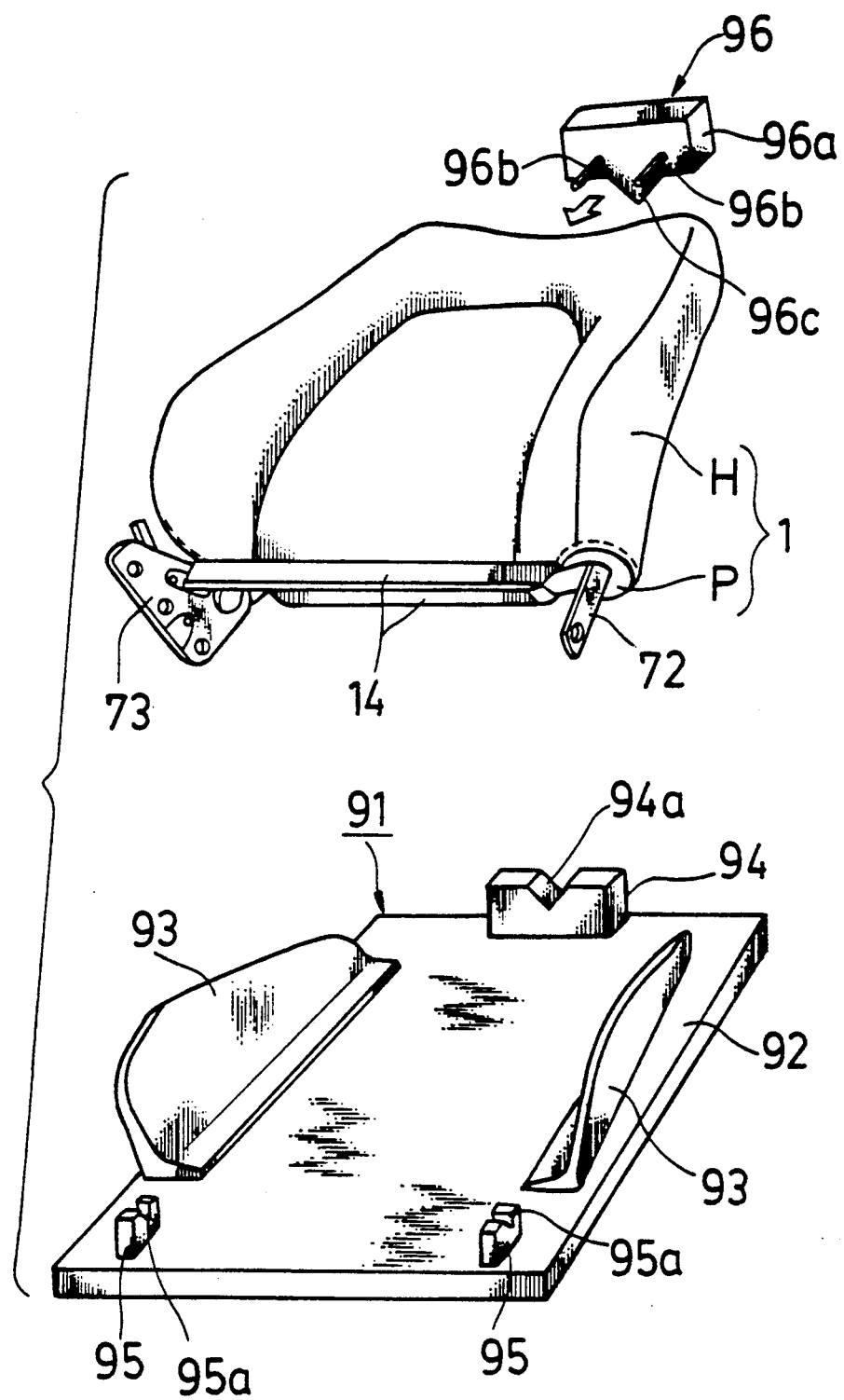
FIG. 23 is a perspective view for illustrating a state of arranging, into an arranging die a seat before bonding in which the seat frame attached with the press bonding plate is mounted in the skin material.

Then, the provisionally assembled skin material H, the cushioning pad P and the seat frame F are arranged on the arranging die 91. As shown in FIG. 23, in the arranging die 91 of this embodiment, right and left positioning protrusions 93, 93 are formed longitudinally (vertical direction of the seat) on both right and left sides of the substrate 92 at the lateral position of the seat. Further, a support protrusion 94 for engaging the positioning member 96 is formed at the center on one of the ends of the substrate 92, that is, on the side of mounting the head rest, while positioning protrusions 95 for the seat frame F are formed on the other end of the substrate 92, that is, on the side opposite to that of the support protrusion 94 and at the position located toward the end from the right and left positioning protrusions 93, 93.

As shown in FIG. 23, the positioning member 96 in this embodiment comprises a positioning main body 96a, two connection rods 96b and an engaging protrusion 96c, in which two connection rods 96b are protrude at the same interval as the head rest stay to the positioning main body 96a. An engaging protrusion 96c is formed on the positioning main body 96a at a position perpendicular to the connection rod 96b. The connection rod 96b in this embodiment has a recess 96d formed for engagement with the engaging protrusion 89a of the positioning guide 89 and the support protrusion 94 has an engaging recess 94a formed for fitting with the engaging protrusion 96c of the positioning member 96 in this embodiment. Each of the seat frame positioning protrusions 95 have a recess 95a formed for engagement with the seat frame F.

When the provisionally assembled skin material H, the cushioning pad P and the seat frame F are arranged on the arranging die 91, the connection rods 96b of the positioning member 96 are at first attached into holes 74a of the support metal 74 for the head rest of the seat frame F disposed in the cushioning pad. As shown in FIG. 24, the connection rods 96b is secured by the positioning guide 89 in this case for the head rest as shown in FIG. 24.

Figure 25:
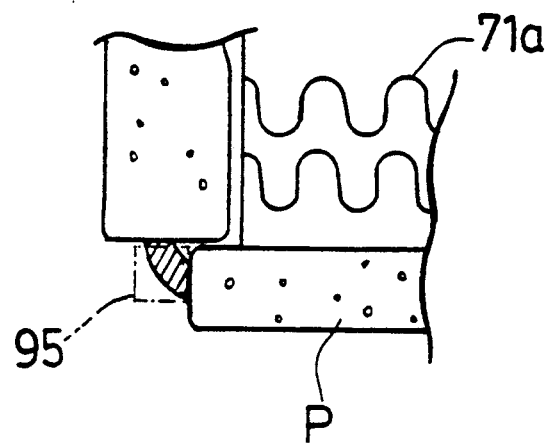
FIG. 25 is an explanatory view for the portion for illustrating the operation of the positioning member as viewed from the back of the cushioning pad.
Figure 26:
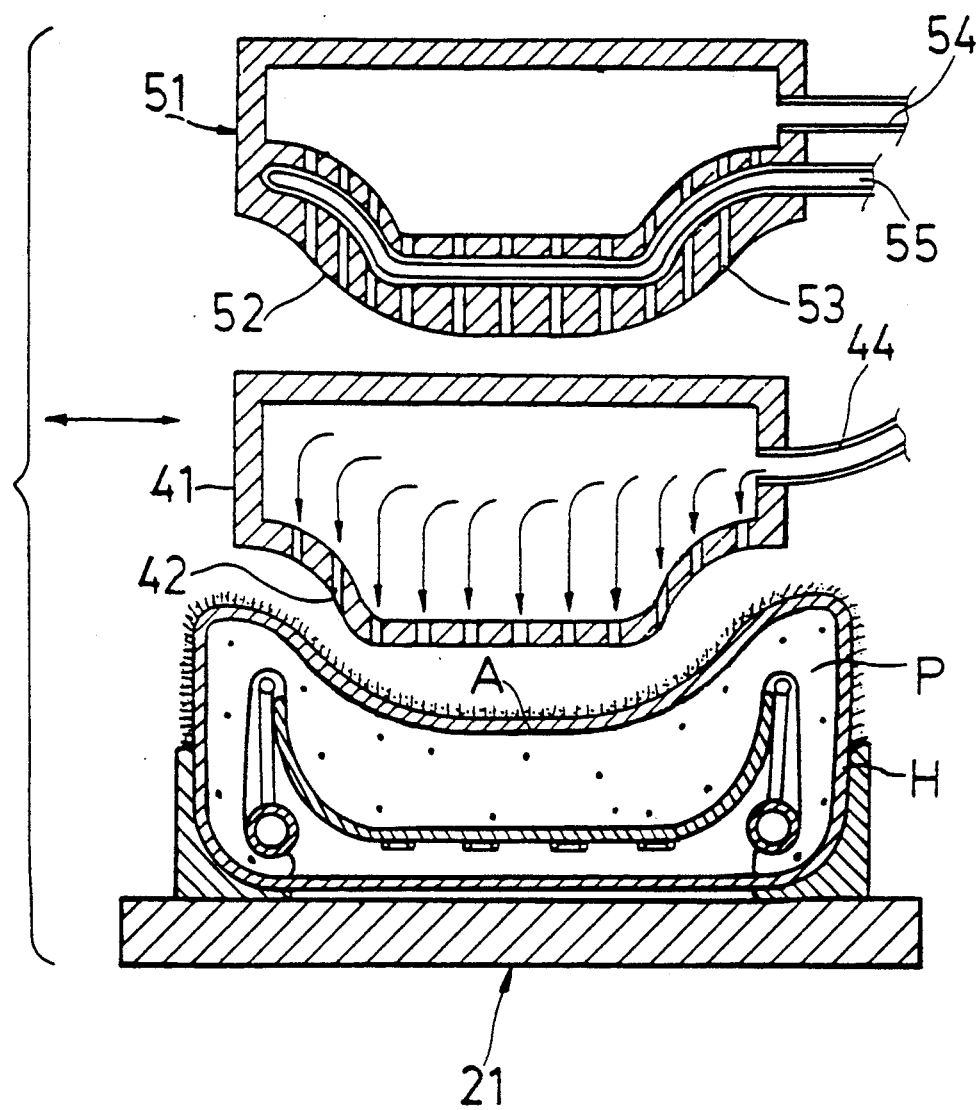
FIG. 26 is a schematic structural view illustrating a production apparatus as another embodiment according to the present invention.
Figure 27:
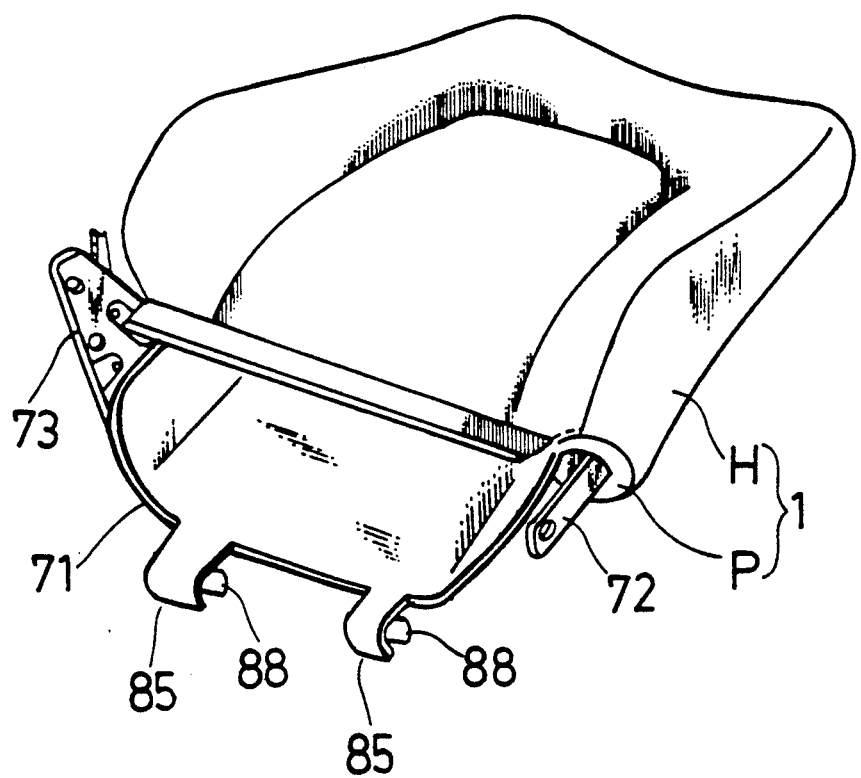
FIG. 27 is a perspective view of the press bonding plate in a state when it is taken out from the inside of the skin material.

Then, the provisionally assembled skin material H, the cushioning pad P and the seat frame F are arranged between the right and left positioning protrusions 93, 93. In this case, as shown in FIG. 25, the seat frame F is engaged in the recess 95a of the positioning protrusion 95 of the seat frame. Then, the engaging protrusion 96c of the positioning member 96 and the engaging recess 94a of the support protrusion 94 on the substrate 92 are engaged with each other for positioning.

Then, heating a step is applied by using the heating die 41 as described above. That is, the skin material H, the cushioning pad P and the seat frame F are provisionally assembled, arranged on the arranging die 91 and then heated from the side of the skin material H by the heating die 41. The heating step is applied in the same manner as in the embodiment described and shown in FIG. 9. Further, a cooling/press bonding step is applied by using the cooling die 51 after the heating. Since the press bonding plate 81 has a shape conforming to the shape at the rearface of the cushioning pad P, the cushioning pad and the cooling die 51 can be seized and pressed effectively between the cooling die 51 and the press bonding plate 81, so that the skin material H and the cushioning pad P can be bonded reliably. For the cooling die 51, air may be forced into the cooling die but it may also be adapted to suck air. Sucking of air can remove excess steam present in the skin material H and the cushioning pad P from the side of the skin material H in a case of using steam for the heating die 41.

After the cooling/press bonding step, the seat back Sb comprising the integrated skin material H, the cushioning pad P and the seat frame F are taken out of the arranging die 91.

The press bonding plate 81 is detached from the seat frame F of the thus taken out seat back Sb. The press bonding plate 81 can be detached by the operations opposite to those of the steps for attaching the press bonding 81 to the seat frame F.

Figure 28:
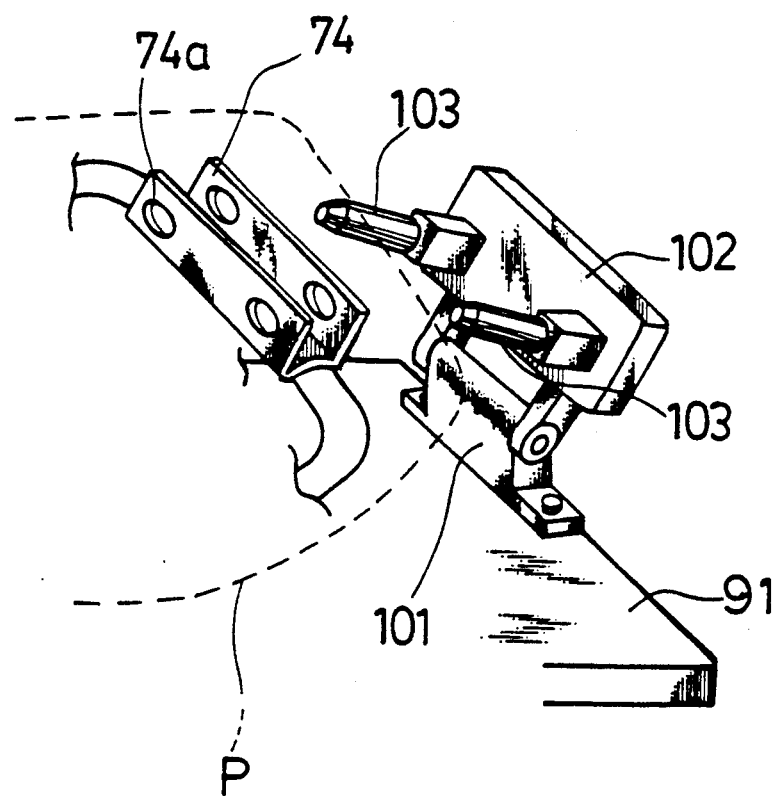
FIG. 28 is a perspective view of a portion showing another embodiment of disposing an arranging die and a seat frame.

In the embodiment described above, description has been made to an example of arranging the provisionally assembled skin material H, the cushioning pad P and the seat frame F on the arranging die 91, by securing the connection rod 96b by the positioning guide 89 for the head rest using the positioning member 96. However, as shown in FIG. 28, it may also be so constituted that a support substrate 101 is protruded on an arranging die 91, a connection rod support 102 is disposed rotatably to the support substrate 101, and connection rods 103 are disposed to the connection rod support 102, so that the connection rods 103 can be mounted into the holes of the support metal 74 of the head rest for the seat frame F disposed within the cushioning pad P. With such a constitution, positioning is possible without using the positioning guide of the head rest and the positioning guide 89 will not be damaged.

What is claimed is:

1. A method of manufacturing a seat comprising a bag shaped skin material, a cushioning pad and an inner region of a seat frame having a flexible member by bonding the bag shaped skin material and the cushioning pad to each other by using a reactive hot melt adhesive, wherein the method comprises the following steps:

coating an adhesive on one side of the cushioning pad, assembling a detachable press bonding plate to be positioned at the inner region of the seat frame, attaching the seat frame assembled with the press bonding plate to the cushioning pad, covering and provisionally assembling the bag shaped skin material to the adhesive coated surface of the cushioning pad, arranging the provisionally assembled bag shaped skin material, the cushioning pad and the seat frame on an arranging die, applying heat to the bag shaped skin material, the cushioning pad and the seat frame arranged on the arranging die by a heating die pressing from the side of the skin material, applying cooling under pressure after the heating step with a cooling die pressing from the surface of the skin material to the cushioning pad, and a step of detaching said press bonding plate from said seat frame after the cooling/press bonding step.

2. A method of manufacturing a seat as defined in claim 1, wherein a plurality of air holes are formed in the press bonding plate.

3. A method of manufacturing a seat as defined in claim 1, wherein means are provided for positioning the assembled components on the arranging die and the position of the provisionally assembled skin material, the cushioning pad and the sheet frame are secured by an engaging protrusion formed in the arranging die and by a positioning member for engagement with the engaging protrusion during the step of arranging.

4. A method of manufacturing a seat as defined in claim 1, including a connection portion for holding a head rest stay which includes forming a movable protrusion capable of fitting into the holding portion of said rest stay to secure the protrusion into the holding portion of said head rest stay.

5. A method of manufacturing a seat as defined in claim 1, wherein a connection pipe in communication with a heating device is attached to the heating die, a plurality of through holes are formed in a die face of said heating device and a buffering material is mounted over the through holes.

* * * * *